March 16, 1965 K. STEISSLINGER 3,173,350
PHOTOGRAPHIC CAMERA WITH AUTOMATIC
AND/OR MANUAL EXPOSURE CONTROL
Filed Dec. 21, 1962 2 Sheets-Sheet 1
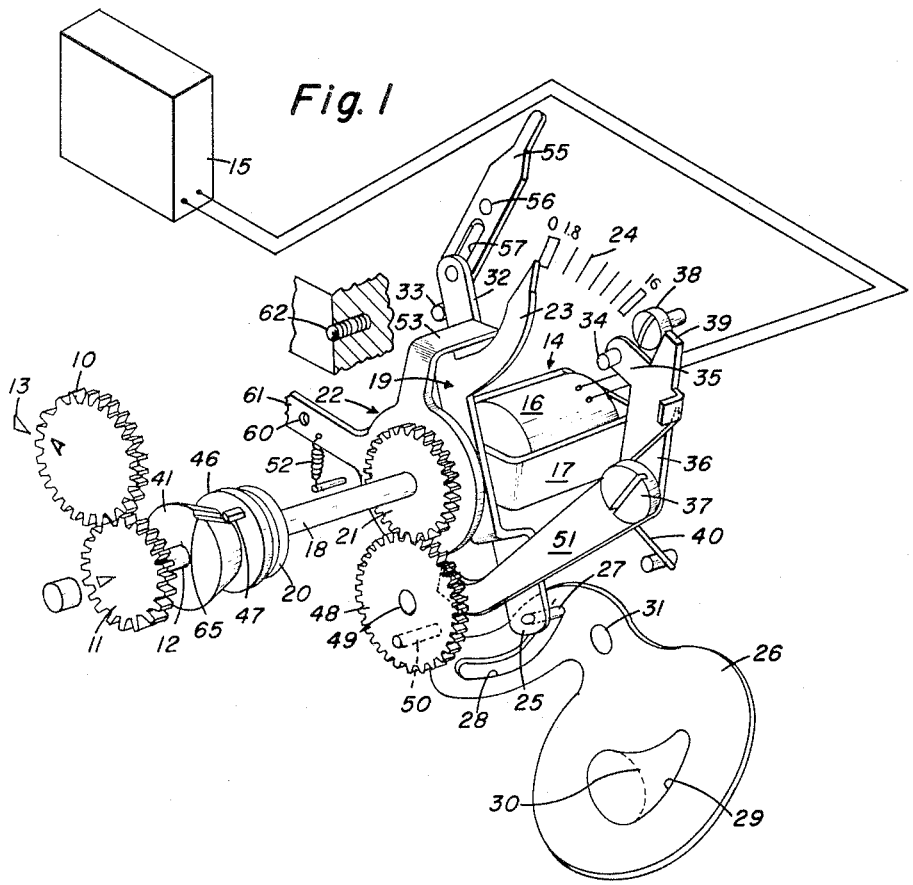
KURT STEISSLINGER
INVENTOR.
BY
ATTORNEY & AGENT March 16, 1965  K. STEISSLINGER  3,173,350
PHOTOGRAPHIC CAMERA WITH AUTOMATIC
AND/OR MANUAL EXPOSURE CONTROL
Filed Dec. 21, 1962  2 Sheets-Sheet 2

KURT STEISSLINGER
INVENTOR.

BY R. Frank Smith
Lloyd L. Seebach
ATTORNEY & AGENT

United States Patent Office 3,173,350
Patented Mar. 16, 1965

3,173,350
PHOTOGRAPHIC CAMERA WITH AUTOMATIC AND/OR MANUAL EXPOSURE CONTROL
Kurt Steisslinger, Stuttgart-Hedelfingen, Germany, assignor to Eastman Kodak Company, Rochester, N.Y., a corporation of New Jersey
Filed Dec. 21, 1962, Ser. No. 246,443
6 Claims. (Cl. 95—64)

The present invention relates to a photographic camera having a photoelectric exposure control system for establishing an exposure opening as a function of scene brightness, and more particularly to means for closing the exposure opening or establishing a fixed exposure opening independently of the exposure control system.

It is well known in the camera art to disable a photoelectric exposure control system by opening or short circuiting the measuring instrument in order that the instrument coil will return to a zero position, usually corresponding to the maximum diaphragm opening. The coil can then be turned by means of a manually operable member in order to actuate the diaphragm to a selected exposure opening. It is also well known in those cameras having a photoelectric exposure control system in which the position of the instrument coil is sensed by a movable member for actuating the diaphragm to a corresponding exposure opening, to disable the moving or sensing member and then to manually actuate the diaphragm and thereby select an exposure opening. In each such exposure control system, the automatic diaphragm control is diabled and can be re-enabled only by activating those elements which formerly disabled it.

The present invention overcomes the disadvantages of the prior art in that the diaphragm can be actuated to a fixed exposure opening or to a fully closed position by one of several manually operable members without disabling the photoelectric exposure control system. In addition, when the manually operable member is fully released, the exposure control system takes over immediately and establishes an exposure opening in accordance with the light incident on the photocell. In order to change from automatic to manual control of the diaphragm, a single operating member is frictionally coupled to the exposure control system so as to operate the system mechanically and, in effect, override the photoelectric exposure control system.

The primary object of the invention is, therefore, to provide a camera having an operable member which is capable of setting the exposure opening independently of a photoelectric exposure control system.

A further object of the invention is to provide a camera having an operable member which is capable of actuating the diaphragm to a fixed exposure opening or to a completely closed position independently of the photoelectric exposure control system.

Still another object of the invention is to provide a camera having an operable member which is capable of holding the diaphragm in a set exposure opening, whether such opening is established by a photoelectric exposure control system or by a manually operable means.

And still another object of the invention is to provide a camera having an operable member that is capable of setting a fixed exposure opening and which, upon release, permits the photoelectric exposure control system to set the exposure opening when the prevailing light condition is reached.

These and other objects and advantages will be apparent to those skilled in the art by the following description when read in conjunction with the drawings.

Reference is now made to the accompanying drawings wherein like reference numerals designate like parts and wherein:

FIG. 1 is a perspective view showing the arrangement by which the photoelectric exposure control system and the manually operable means are connected to the camera diaphragm for effecting an exposure opening;

FIG. 2 is a vertical section through a portion of the mechanism shown in FIG. 1 and shows the axial relationship of the various elements;

Figures 3, 4:
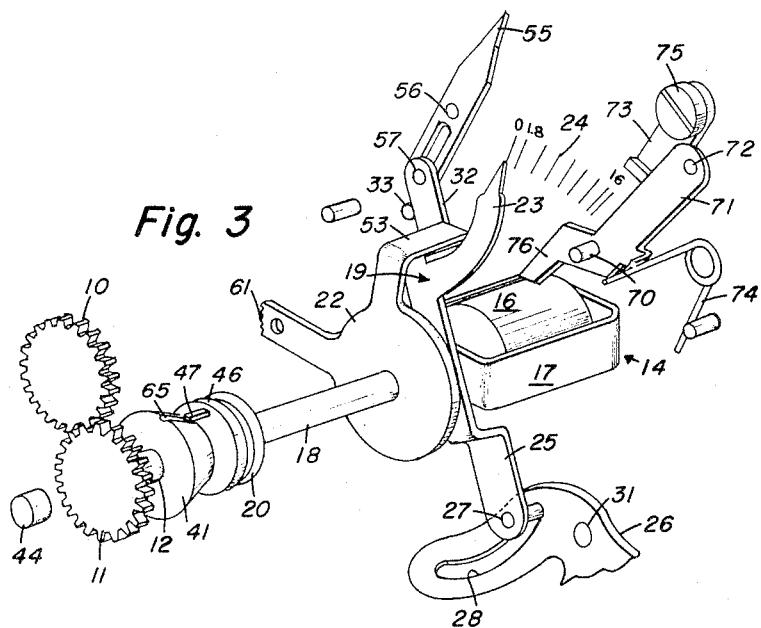
FIG. 3 is a perspective view similar to FIG. 1 showing another embodiment of limiting stops for the diaphragm operating member.
FIG. 4 is a view of the exposure opening scale showing means for indicating that the diaphragm is fully closed or in a fully open position.

With particular reference to FIG. 1 of the drawings, the setting member 10 comprises a wheel having a toothed periphery which is arranged to mesh with a gear 11 on the shaft 12 as shown more fully in FIG. 2, a portion of the periphery of gear 10 extending outside of the camera casing for manual actuation. The setting member 10 is provided with a notation or designation A to indicate when the photoelectric exposure control system is automatic, and this designation is set with respect to an index 13.

The photoelectric exposure control system, designated broadly by the numeral 14, comprises a photocell 15 which is arranged in a conventional manner on the front panel or wall of a camera and connected to an electrical measuring instrument 16. The instrument 16 includes a frame 17 which is pivotally mounted for free movement in response to energization of the instrument 16 by light incident on the cell 15 in a well-known manner.

Shaft 18 is arranged in axial alignment with the measuring instrument 16, and control member 19 is fixed to one end thereof together with the frame 17. At the other end of shaft 18, a disk 20 is secured or formed integral therewith, the disk 20, control member 19 and frame 17 being moved as a unit with energization of measuring instrument 16. Gear 21 and actuating member 22 are arranged on shaft 18 so as to be freely rotatable thereon, gear 21 and actuating member 22 being rotatable as a unit. Control member 19 is provided with an arm 23 which is movable relative to a scale 24 to designate the size of the exposure opening. The other end 25 of control member 19 is pivotally connected to diaphragm blade 26 by means of pin 27 on the end 25 and the slot 28 in the diaphragm blade. Diaphragm blade 26 is provided with an exposure slot 29 which is movable relative to the aperture 30 as the blade is pivoted about the axis 31. The size of the exposure aperture is therefore varied from a maximum opening as shown in FIG. 1 to a minimum opening when the blade 26 has been pivoted in a clockwise direction as described hereinafter.

Control member 19 is also provided with an arm 32 which normally abuts a fixed stop 33, in which position the control member maintains the diaphragm blade 26 in a position to provide the maximum exposure opening. As control member 19 is moved in a clockwise direction to reduce the size of the exposure opening in accordance with the light incident on the cell 15, the portion 23 will abut a stop 34 when the maximum light condition is incident on cell 15. Stop pin 34 is carried on an arm 35 of lever 36 which is pivotally mounted with respect to the stud 37. The relation of pin 34 relative to the scale 24 can be varied by means of the eccentric stud 38 which engages a tongue 39 on lever 36. Lever 36 is biased against stud 38 by means of spring 40 as shown in FIG. 1. By this arrangement, the minimum exposure opening can be finely adjusted by rotating stud 38 in the proper direction so as to increase or decrease the range of movement of control member 19.

Gear 11 is fixed to shaft 12 which is movable relative to a fixed cam 41, as best shown in FIG. 2. Shaft 12 is journaled in the front wall 42 of the camera and in the bearing 43 as shown in FIG. 2. The end of shaft 12 to the left of gear 11 is fixed to a button 44 and by means of spring 45 is biased in a direction so as to maintain gears 10 and 11 in meshing relationship. The other end of shaft 12 carries a plate 46 which is provided with axially extending pins 47 for engaging the conical face of cam 41. As shown in FIG. 2, shafts 12 and 18 are axially aligned, but disk 20 is separated from plate 46 by a distance sufficient to permit free movement of shaft 18 under automatic operation without interference or engagement with plate 46.

A gear 48 is rotatably mounted on a stub shaft 49 for meshing with gear 21 which is rotatable with the operating member 22. Gear 48 carries a pin 50 which is arranged to engage the arm 51 of lever 36. Operating member 22 is normally biased in a counterclockwise direction by spring 52, and in this position, the extension 53 formed integral with member 22 is disengaged from the arm 23 of control member 19.

When gear 10 is positioned so the designation A is opposite the index 13, the diaphragm blade 26 is actuated in a normal manner for automatic exposure control. Under this condition, the light incident on cell 15 energizes the measuring instrument 16 which, in turn, causes clockwise rotation of the frame 17, as well as the shaft 18 and control member 19 which are fixed thereto. As control member 19 moves with shaft 18, the pin 27 and slot 28 connection to diaphragm blade 26 moves the blade in a clockwise direction about its pivot 31 to establish an exposure opening as a function of scene brightness, such opening being indicated to the operator by the position of the arm 23 relative to the scale 24. The scale 24 can be arranged in the direct view of the operator or a member can be actuated relative to a scale in the viewfinder by means of the lever 55 which is pivotally mounted at 56 and connected to the arm 32 of control member 19 by the pin and slot connection 57.

If it is desired to maintain a fixed exposure opening while the setting member 10 is in the automatic position, button 44 can be moved in an axial direction which moves shaft 12 and plate 46 fixed thereto into engagement with disk 20 so as to prevent rotation of shaft 18. By this means, any exposure opening can be obtained by pointing the camera in the direction which will provide light conditions for registering the desired exposure opening on scale 24 by arm 23, and then with depression of button 44 holding the scale member in this position. Upon release of button 44, the automatic exposure control system will immediately take over and the exposure opening will be established in accordance with the light conditions incident on cell 15.

In order to completely close the exposure opening 30 by means of diaphragm blade 26, member 22 is rotated in a clockwise direction by means of arm 61 which extends to the outside of the camera, and with this movement, extension 53 engages arm 19 to actuate the diaphragm blade 26 independently of the exposure control system. At the same time, gear 21 imparts this motion to gear 48 and pin 50 is moved toward arm 51 of lever 36. At the time that arm 23 engages pin 34 on lever 36, pin 50 will also have engaged arm 51 and with further movement of member 22, pin 50 rotates lever 36 in a clockwise direction so as to move pin 34 with arm 23 thereby permitting continued movement in order to actuate the diaphragm blade 26 to a position in which the exposure opening 30 is completely closed. In this fully closed position, a detent 60 on the arm 61 of member 22 engages a spring-biased ball 62 which holds the member 22 and the diaphragm blade 26 in a position in which the exposure opening is fully closed. Upon release of the member 22, spring 52 immediately returns it to its normal position and control member 19 and lever 36 follow until they reach their respective positions as determined by the light conditions incident on cell 15 and by engagement with stud 38.

For manual setting of the exposure opening, the setting member 10 is rotated in a counterclockwise direction and this motion is imparted to shaft 12 by means of gear 11. As shaft 12 starts to rotate, the pins 47 are moved toward the sides of the axial cam grooves 65 in cam 41. Since cam 41 is fixed in position, pins 47 are moved axially and plate 46 is cammed against disk 20 to provide a frictional coupling between shaft 12 and shaft 18. Movement of shaft 12 is thereby imparted to shaft 18 and to control member 19 for actuating the diaphragm blade 26 to a position for establishing an exposure opening in accordance with the position of arm 23 relative to scale 24. Due to the camming action of pins 47 against the surface of cam 41, the frictional coupling between plate 46 and disk 20 is maintained so long as pins 47 are not brought into registry with the grooves 65. As soon as setting member 10 is rotated to align the designation A with the index 13, the grooves 65 are then aligned with pins 47, and plate 46 and disk 20 are thereby separated to break the coupling between shafts 12 and 18 due to the action of spring 45. When this is accomplished, the control member 19 is again free to be rotated by means of the exposure control system in the normal manner.

With reference to FIG. 3, another embodiment for establishing the movable stop for the control member 19 is disclosed. In this embodiment, the adjustable pin 70 is carried by a lever 71 that is pivotally mounted at 72, the lever 71 being biased against a stop member 73 by spring 74. The member 73 is mounted by means of eccentric stud 75 so as to adjust the position of extension 76 on lever 71 relative to extension 53 for varying the minimum exposure opening. In this embodiment, the extension 76 lies ahead of pin 70 so that, as the arm 23 abuts pin 70, the leading edge of the extension 53 will also engage the edge of extension 76. As a result, continued movement of member 22 in a clockwise direction will move both control member 19 and lever 71 so as to actuate diaphragm blade 26 to a position in which the exposure opening is completely covered. As in the previously described embodiment, the arm 61 of member 22 can be provided with means for locking it in the position for maintaining the exposure opening 30 fully closed.

In FIG. 4, another embodiment for indicating that the exposure opening 30 is fully opened or fully closed is disclosed in connection with the scale 24 or a similar scale 24' which can be arranged in the viewfinder. In this instance, areas 78 and 79 on either side of the maximum and minimum exposure opening designations are provided with different colors to indicate to the operator, as the indicator enters these areas, the condition of the exposure opening.

It should be readily apparent to those skilled in the art that the manually operable means disclosed and described hereinabove are applicable to both still and cine cameras. The member 22, which is utilized to fully close the exposure opening, can be used for this purpose in a still camera and can also be utilized to provide lap dissolves in a cine camera. By the same token, the friction coupling between shafts 12 and 18 can be utilized in either type of camera. Further, it will be evident to those skilled in the art that various modifications in the embodiments described above can be made without departing from the spirit of the invention. However, the scope of the invention is not to be limited to the embodiments described herein but is as defined by the appended claims.

I claim:

1. In a camera having a photoelectric exposure control system for regulating the exposure of film in said camera, said control system comprising an electric measuring instrument, a photocell energizable by scene light for energizing said measuring instrument, and an adjustable diaphragm; the combination comprising:

operating means coupled to said diaphragm and normally movable in response to energization of said measuring instrument for actuating said diaphragm to establish an exposure opening as a function of scene brightness;

first manually operable means adapted to be moved into engagement with said operating means for actuating said diaphragm to a fully closed position independently of said exposure control system;

second manually operable means adapted to be coupled to said operating means for actuating said diaphragm to establish a fixed exposure opening independently of said exposure control system; and holding means adapted to be moved into engagement with said operating means for maintaining said operating means in the position established by said exposure control system or said first manually operable means at the election of the operator.

2. In a camera having a photoelectric exposure control system for regulating the exposure of film in said camera, said control system comprising an electric measuring instrument, a photocell energizable by scene light for energizing said measuring instrument, and an adjustable diaphragm; the combination comprising:

operating means coupled to said diaphragm and normally movable in response to energization of said measuring instrument for actuating said diaphragm to establish an exposure opening as a function of scene brightness;

manually operable means adapted to be moved into engagement with said operating means for actuating said diaphragm to a fully closed position independently of said exposure control system;

a stop member arranged in a normal position in the path of movement of said operating means for limiting the movement thereof to establish a minimum exposure opening; and means movable with said manually operable means for engaging said stop member as it is engaged by said operating means and moving it therewith so as to free said operating means for further movement to completely close said diaphragm.

3. A camera in accordance with claim 2 including means arranged adjacent said stop member when it is in said normal position for varying the normal position thereof to establish an engaging position in accordance with the minimum exposure opening.

4. A camera in accordance with claim 2 wherein said stop member comprises a pivotally mounted lever having a first member adapted to be engaged by said operating means for limiting the movement thereof and a second member adapted to be engaged by said movable means for moving said lever.

5. A camera in accordance with claim 2 wherein said movable means comprises an extension formed from said manually operable means and movable therewith for engaging said operating means and said stop member, respectively, to actuate said diaphragm to a fully closed position.

6. A camera in accordance with claim 2 and including means for locking said manually operable member in the position in which said diaphragm is completely closed.

References Cited in the file of this patent

UNITED STATES PATENTS

| 2,923,170 | Pfaffenberger | Feb. 2, 1960 |
| 3,077,153 | Gopfert | Feb. 12, 1963 |

FOREIGN PATENTS

| 628,175 | Canada | Sept. 26, 1961 |